United States Patent
Zacay et al.

(10) Patent No.: US 11,860,795 B2
(45) Date of Patent: Jan. 2, 2024

(54) DEVICE, SYSTEM, AND METHOD OF DETERMINING MEMORY REQUIREMENTS AND TRACKING MEMORY USAGE

(71) Applicant: Arm Limited, Cambridge (GB)

(72) Inventors: Itay Zacay, Rosh HaAyin (IL); Adi Kachal, Netanya (IL); Roee Friedman, Modiin (IL); Dvir Shalom Marcovici, Kfar Saba (IL); Uri Eliyahu, Hadera (IL)

(73) Assignee: ARM LIMITED, Cambridge (GB)

( * ) Notice: Subject to any disclaimer, the term of this patent is extended or adjusted under 35 U.S.C. 154(b) by 281 days.

(21) Appl. No.: 16/792,901

(22) Filed: Feb. 18, 2020

(65) Prior Publication Data
US 2021/0255968 A1 Aug. 19, 2021

(51) Int. Cl.
*G06F 12/14* (2006.01)
*G06F 12/02* (2006.01)

(52) U.S. Cl.
CPC ...... *G06F 12/1416* (2013.01); *G06F 12/0238* (2013.01); *G06F 12/1441* (2013.01); *G06F 2212/1052* (2013.01)

(58) Field of Classification Search
CPC ............. G06F 12/1416; G06F 12/0238; G06F 12/1441; G06F 2212/1052
See application file for complete search history.

(56) References Cited

U.S. PATENT DOCUMENTS

| | | | | |
|---|---|---|---|---|
| 4,985,825 A | * | 1/1991 | Webb, Jr. | G06F 11/073 712/E9.06 |
| 2006/0080520 A1 | * | 4/2006 | Dickenson | G06F 11/0751 711/170 |
| 2007/0294691 A1 | * | 12/2007 | Park | G06F 9/445 718/100 |
| 2019/0377556 A1 | * | 12/2019 | Mishra | G06F 11/0766 |
| 2020/0334361 A1 | * | 10/2020 | Sinha | G06F 21/575 |
| 2021/0072906 A1 | * | 3/2021 | Kallam | G06F 12/0646 |

* cited by examiner

*Primary Examiner* — Jae U Yu
(74) *Attorney, Agent, or Firm* — Talem IP Law, LLP (57) ABSTRACT

Device, system, and method of determining memory requirements and tracking memory usage. A method includes: dynamically modifying, in an iterative process including two or more iterations, a maximum size of Random Access Memory (RAM) that a Memory Protection Unit (MPU) authorizes an executable program code to access. In each iteration, the method includes running that executable program code while the MPU enforces a different maximum size of RAM, and monitoring whether the executable program code attempted to access a RAM memory address that is beyond that maximum size of RAM in that iteration. Based on such iterations, the method determines a minimum size of RAM that is required for that executable program code to run without causing a memory access fault.

20 Claims, 3 Drawing Sheets

DEVICE, SYSTEM, AND METHOD OF DETERMINING MEMORY REQUIREMENTS AND TRACKING MEMORY USAGE

FIELD

Some implementations relate to the field of electronic devices.

BACKGROUND

Millions of users utilize electronic devices on a daily basis for various purposes. Smartphones, tablets, laptop computers, desktop computers, and other electronic devices are utilized for word processing, sending and receiving electronic mail (email), browsing the Internet, watching videos, capturing images, video conferencing, performing online purchases and transactions, and performing various other activities.

An electronic device typically includes a processor able to execute code, a memory unit able to store code and data, an input unit, an output unit, and other components.

DETAILED DESCRIPTION

The Applicants have realized that in some development environments, a developer may utilize a development platform which includes a Random Access Memory (RAM) memory unit having a first size, to develop firmware or code or other program. The program may run properly on the development platform; however, the same program may later fail to run, or may run improperly or may cause runtime errors or faults, when being embedded or integrated into a runtime platform which includes a RAM memory unit having a second size which is smaller than the first size.

For example, a developer may utilize a development platform having a processor and a RAM memory unit of 1,000 kilobytes. The developer produces a firmware code that runs properly on the development platform. Later, the same firmware code is installed in, or is integrated or embedded in, a runtime platform which includes a RAM memory unit of only 300 kilobytes. The firmware code may fail to run on the runtime platform, or may run improperly or may generate runtime errors or faults when running on the runtime platform.

For example, the firmware code may attempt to access a memory cell or a memory region in the RAM memory of the runtime unit that is beyond the 300 kilobyte capacity of the RAM memory of the runtime platform. Such attempt may occur via one or more memory access ways in which a program or a code accesses a memory region or a memory address; such as, directly by a pointer to the target area of the memory being accessed (e.g., directly to a particular memory address), or using a suitable function for memory allocation (e.g., malloc) of the Operating System (OS). For example, an attempt by the developed code to read a value from a RAM memory address that is located at the 400th kilobyte of the RAM memory, would be successful on the development platform (which includes RAM memory of 1,000 kilobytes), but would fail on the runtime platform (which includes RAM memory of only 300 kilobytes).

The Applicants have realized that conventional solutions that attempted to mitigate this problem are partial or inadequate. In a first conventional solution, the runtime platform is equipped to include a RAM memory unit having a large size, or having a RAM memory size that is at least as large as the size of the RAM memory of the development platform. However, realized the Applicants, such conventional solution may be inadequate. For example, in some situations, it may not be possible to equip the runtime platform with a larger-size RAM memory, due to form factor constraints of the runtime platform, or due to power consumption constraints, or design constraints, or physical size or physical arrangements constraints, or other limitations. This is particularly true when the runtime platform is not a full-size desktop computer or laptop computer, but rather, when the runtime platform is a small-sized or even a minuscule Internet-of-Things (IoT) sensor or device, or is part of a vehicular component or vehicle, or is part of a medical device or medical equipment, or is part of another electronic device having a limited form factor that makes it prohibitive to increase the size of the RAM memory of the runtime device.

Additionally, realized the Applicants, in some situations, the entity that constructs or manufactures the runtime platform, does not know at all what was the size of the RAM memory that was utilized (often by a different entity) on the development platform; and/or does not know what is the minimum size of RAM memory that should be included in the runtime platform in order to ensure that the code properly run thereon. Furthermore, in some situations, the knowledge of the fact that the development platform had include 10 megabytes of RAM memory, does not help at all the entity which constructs or manufactures the runtime platform which is structured to have RAM memory in the size range of 300 to 600 kilobytes.

In another conventional and cumbersome solution that attempts to mitigate the problem, a code that was developed on a development platform having RAM memory of (for example) 10 megabytes, can be tested on various runtime platforms having different sizes of RAM memory units. However, this requires to manually construct dozens, or even hundreds, of such runtime platforms having different sizes of RAM memory units; and requires to manually install and test the numerous hardware configurations, in a cumbersome process that is time consuming and effort consuming and does not scale well.

Furthermore, realized the Applicants, even such conventional testing may not always detect or reach the correct answer; for example, particularly if the developed code attempts to read a value from a "forbidden" region of the RAM memory, rather than attempting to write a value into such RAM region. For example, the developed code is run on a first runtime platform having only 300 kilobytes of RAM; attempts to write a value into a memory cell located at the 420th kilobyte of RAM; and such write operation causes a fault that the runtime platform may capture and report during a debugging stage. However, realized the Applicants, an attempt of the developed code, intentionally or accidently, to read a value from the 420th kilobyte of RAM, may go unnoticed and may not necessarily trigger an error or a fault or an exception on the runtime platform; since, for example, in some situations, such Read attempt may return a "zero" or a "null" result instead of an error indication, thereby letting such "forbidden" Read memory access to go unnoticed on the runtime device.

In a similar conventional attempt to mitigate the problem, a conventional system may "paint" the RAM memory that is utilized on the development platform with a particular pattern or repeated fixed string of values or bits, and to later check whether that pattern was overwritten (during runtime, or during test runs) at memory regions that are "forbidden" to be accessed. For example, the development platform includes a RAM memory of 5,000 kilobyte; and the develop estimates that the developed code requires only 300 kilobytes of RAM, and also estimates that the developed code would never access the upper 4,700 kilobytes of RAM that actually exist on the development platform. Accordingly, the developer modifies the developed code, such that: before the intended code is run, a Memory Painting code is executed, and it fills the upper 4,700 kilobytes of RAM memory with a repeated string (e.g., the string "DEADBEEF", repeated continuously as in "DEADBEEFDEADBEEF" and so forth). Then, after the intended code is run, the developed code executes a Painting Checker code, which checks whether the upper 4,700 kilobytes of RAM memory still contain, exclusively, only the repeated string "DEADBEEF" without any modifications. This conventional method may, in some situations, detect that the developed code has indeed written a value into the "forbidden" RAM area of the upper 4,700 kilobytes of RAM which had been "painted" in advance with the repeated string. However, the Applicants have realized that such solution is cumbersome, time consuming and effort consuming; and it requires to develop and to execute a prior code and a subsequent code, before and after (respectively) the execution of the actual code that would ship to third parties; and the memory "painting" process, as well as the later verification that the "painted" memory regions remained unmodified, may be slow. Furthermore, this conventional method might catch some improper Write operations towards a RAM memory address in the forbidden RAM region; but it may not catch an improper Read operation from such RAM memory address in the forbidden RAM region. Moreover, this conventional method may not catch an improper Write operation that wrote into the forbidden RAM memory region a value that happens to be identical to the value that had been "painted" there in advance; such as, a Write operation that writes the value "D" into the exact place that already stored a value of "D" in one of the repeating "DEADBEEF" strings that had been painted.

The Applicants have also realized that there does not exist an adequate solution or system, which enable a developer utilizing a development platform, to determine and to ascertain in advance what is the minimum RAM memory requirements that are mandatory to exist in the runtime platform in order for the developed code to properly run on such runtime platform. Indeed, many software applications that are sold to the general public as a boxed software product are often marketed with a caption indicating "minimum requirements" for Operating System version, RAM memory size, hard disk storage size, and/or processing power; however, such requirements are often inaccurate and do not reflect the actual size of mandatory RAM memory that is absolutely necessary in order for the code to run; and such general software requirement do not apply to a firmware code that is developed on a development platform in order to later be embedded as firmware in a particular electronic device.

The Applicants have thus realized that there is a need for a system that would enable a developer, who utilizes a development platform to develop code (particularly firmware code, although this is only a non-limiting example) to test and to check in advance, on his development platform, whether the developed code is expected to run properly on a different platform (runtime platform) that would have a particular RAM memory size that is smaller than the RAM memory size of the development platform.

The Applicants have further realized that there is also a need for a system that would enable a developer, who utilizes a development platform to develop code, to determine and to ascertain in advance what is the minimum requirement of RAM memory size that a runtime platform must include, in order for the developed code to run properly on such runtime platform. The Applicants have also realized that this information would also be useful for entities that construct and produce such runtime platforms, which may often be constrained with regard to the storage capacity or the size of the memory unit that they can include in the runtime platform, due to form factor constraints, power consumption constraints, design constraints, or other constraints.

Accordingly, some implementations enable to test and to check in advance whether a firmware code, that is being developed on a development platform having a first circuit board with a RAM memory unit having a first RAM memory size, would run properly on a runtime platform having a second circuit board with a RAM memory unit having a second, smaller, RAM memory size.

Some implementations may enable a developer or a development group or entity, to ensure that a developed code that indeed runs properly on a development platform having a development board and a development RAM memory, would also run properly on runtime platforms having other sizes of RAM memory; and to ensure that such developed code would not improperly attempt, accidently or intentionally, to read values from or to write values into a memory address that exists on the development platform but does not exist on the runtime platform. Some implementations may enable developers of firmware, and other types of code, to confidently ship such firmware or code to an entity that produces runtime platforms, without the need to later debug and fix the already-shipped code due to its failure to properly run on a runtime platform.

Figure 1A:
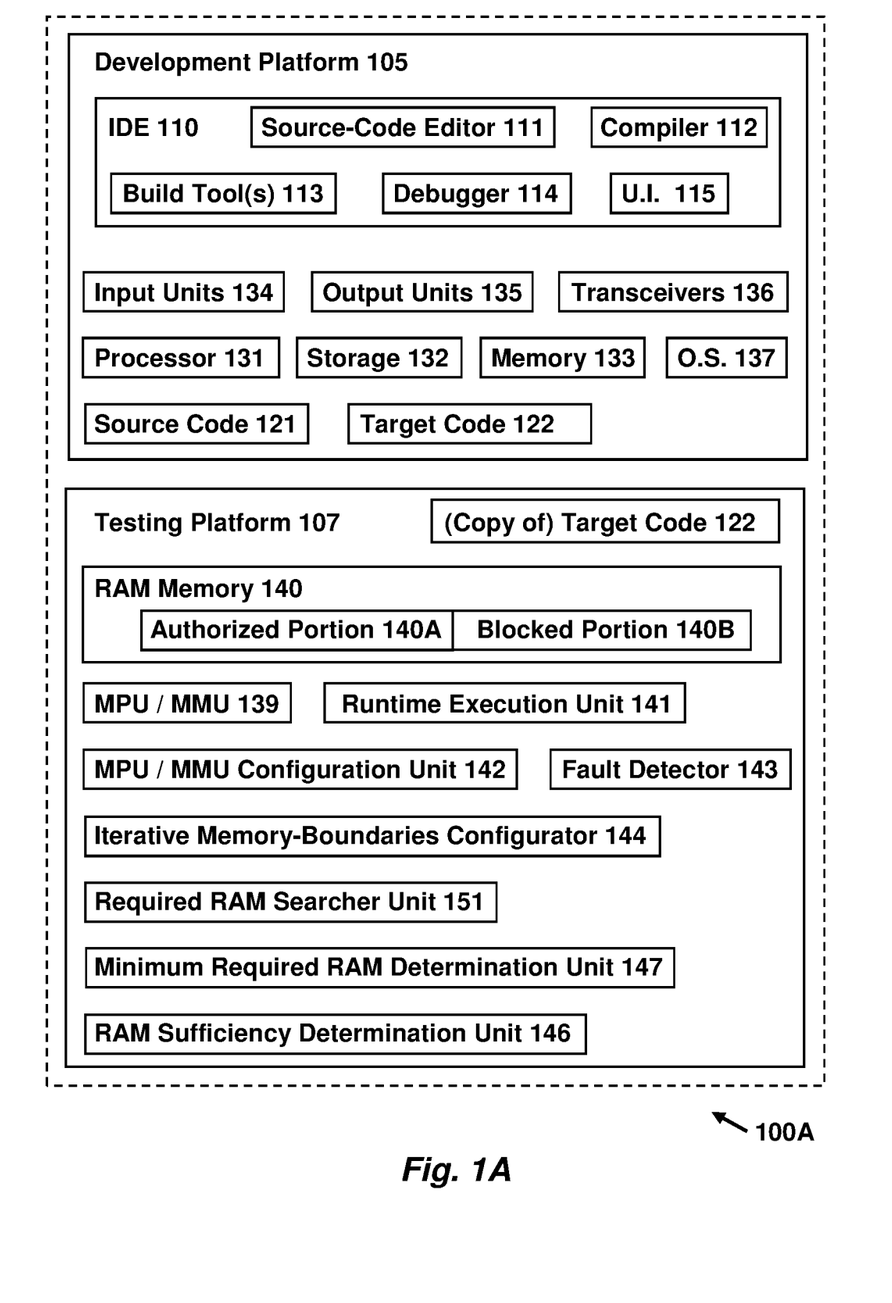
FIG. 1A is a schematic illustration of a system, in accordance with some implementations.

Reference is made to FIG. 1A, which is a block diagram illustration of a system 100A, in accordance with some demonstrative implementations. System 100A may be utilized to develop and test a code or a program (e.g., particularly firmware code, as a non-limiting example), which may be referred to as "the target code" or "the executable code"; and to determine what is the minimum amount or size of RAM memory that is absolutely required to exist on a runtime platform in order to properly run the target code, and to test (e.g., iteratively) whether or not the target code would properly run on a runtime platform having a particular amount or size or RAM memory.

In a demonstrative implementation, System 100A may comprise a Development Platform 105 for developing a code, and a Testing Platform 107 for testing the code and determining its minimum RAM requirement at runtime (e.g., in order to determine what is the absolute minimum size of RAM memory, that an IoT device or other target device should have in order to properly run the Target Code 122 therein).

Development Platform 105 may include an Integrated Development Environment (IDE) 110 or other tool for efficient development of a code or program. For example, IDE 110 may include a Source-Code Editor 111, enabling a developer to write and edit source-code. IDE 110 may further comprise a Compiler 112, able to translate the source-code, typically from a high-level programming language to a lower-level language (e.g., machine code, object code, assembly language) and/or able to create from the source-code a machine-executable program. IDE 110 may further include one or more Build Tool(s) 113 or build automation tools, to facilitate the generation or the packaging of a "software build". IDE 110 may include a Debugger 114, enabling to run the target code under controlled conditions that permit monitoring and tracking of the execution progress as well as the utilization and status of system resources. IDE 110 may include a User Interface (UI) 115 (e.g., graphical UI and/or text-based UI), which enables a developer or a development team to activate and to configure the relevant modules of IDE 110. Optionally, IDE 110 may comprise, or may be associated with, other suitable modules or unit; such as, for example, a version control system, a class browser, an object browser, or the like.

A developer or a development team may utilize the Development Platform 105 and the IDE 110 in order to write and edit a Source Code 121, and to generate from it an executable code which is Target Code 122. Development Platform 105 may be implemented via, or on, a computerized device or a computer, for example, a laptop computer or a desktop computer or a workstation. Development Platform 105 may include suitable hardware components and software components, such as: a processor 131 able to execute code, a storage unit 132 able to store data long-term (e.g., a hard disk drive, a solid state drive, a non-volatile storage unit); a memory unit 133 able to store data short-term (e.g., a volatile memory unit, a RAM memory unit); one or more input units 134 (e.g., keyboard, mouse, touch-pad, touch-screen, audio microphone); one or more output units 135 (e.g., screen, touch-screen, audio speakers); one or more wired and/or wireless transceivers 136 (e.g., Wi-Fi transceiver, Bluetooth transceiver); or the like. System 100A may include, or may be implemented using, other suitable hardware components and/or software components; for example, an Operating System (OS) 137, one or more drivers and applications, a power source, or the like.

In the implementation shown in FIG. 1A, the target code 122 is generated on the Development Platform 105; and is then copied or transferred to the Testing Platform 107, for the purpose of testing the target code 122 to determine its minimum RAM requirement when it runs on a target IoT device or other target device. In such implementation, the Development Platform 105 and the Testing Platform 107 are depicted as two separate devices or units or sub-systems. However, this is only a non-limiting example, and other implementations may be used, such that components of System 100A may be distributed across a smaller or a larger number of devices or sub-systems.

In a demonstrative example, a developer utilizes the Development Platform 105 and the IDE 110 to write Source Code 121. The Source Code 121 is stored in storage unit 132, and occupies (for example) 500 kilobytes there. The Source Code 121 is compiled into the executable code, which is Target Code 122; which is also stored in storage unit 132, and occupies (for example) 400 kilobytes there. In the implementation shown in FIG. 1A, target code 122 may be copied or transferred from the development platform 105, to the testing platform 107 that will perform the testing for determining the minimum RAM requirement of that target code 122.

In some implementations, the two size values that were mentioned above (e.g., the size of the source code, and the size of the executable target code) are still not indicative of the actual RAM memory that is required, as a minimum, in order to properly run the target code 122 on the target IoT device; since, for example, a target code 122 that occupies by itself 400 kilobytes, may still require to access a memory region of additional 600 kilobytes for purposes of data processing at runtime.

In a demonstrative example, a RAM memory unit 140 is shown, having a size of (for example) 2,000 kilobytes. A dedicated component or unit, such as a Memory Protection Unit/Memory Management Unit (MPU/MMU) 139, may be comprised in system 100A (e.g., as part of Testing Platform 107), and may operate to manage, map and/or protect the RAM memory unit 140 and/or particular memory portions or memory regions or memory addresses therein. For example, the MPU/MMU 139 may receive from processor 131 a request to access a particular virtual memory address; and may translate it to the respective physical memory address. The MPU/MMU 139 may perform operations other than virtual/physical address translation; for example, configuration and management of virtual memory, management of page tables, memory protection (e.g., preventing a process from accessing a memory address that was not allocated to it), bus arbitration, cache control, or the like.

System 100A may comprise a Runtime Execution Unit 141, which enables a developer to execute the Target Code 122 in a controlled manner, on the Testing Platform 107. In accordance with some implementations, an MPU/MMU Configuration Unit 142 may be utilized, in order to configure or set or modify the registers of the MPU/MMU 139, such that during runtime of the Target Code 122 by the Runtime Execution Unit 141, (i) the MPU/MMU 139 would allow usage of, or access to, a first particular region or portion of RAM memory unit 140 (denoted Authorized Portion 140A), and (ii) the MPU/MMU 139 would disallow or prevent or block usage of, or access to, a second particular region or portion of RAM memory unit 140 (denoted Blocked Portion 140B).

In a demonstrative example, the developer may utilize the MPU/MMU Configuration Unit 142 to configure the MPU/MMU 139, such that: in the next execution of the Target Code 122 (e.g., on the Testing Platform 107), only the first 300 kilobytes of RAM memory unit 140 would be defined and utilized as Authorized Portion 140A and would be accessible by the Target Code 122 (e.g., would be accessible by the Runtime Execution Unit 141 that runs the Target Code 122); and the remaining 1,700 kilobytes of RAM memory unit 140 would be defined and utilized as Blocked Portion 140A and would not be accessible by the Target Code 122 (e.g., would not be accessible by the Runtime Execution Unit 141 that runs the Target Code 122) even though those additional 1,700 kilobytes of RAM memory actually exist in the physical component of RAM memory unit 140.

During runtime of the Target Code 122 on the Runtime Execution Unit 141, the MPU/MMU 139 enforces the memory access constraints as configured by via the MPU/MMU Configuration Unit 142; such that, only the Authorized Portion 140A of RAM memory unit 140 is accessible by the running code, and such that the Blocked Portion 140A of RAM memory unit 140 is blocked and is not accessible by the running code. During runtime of Target Code 122 at the Runtime Execution Unit 141, if the Target Code 122 attempts to access a RAM memory address (or memory region, or memory portion) that was defined as "forbidden" (e.g., located in Blocked Portion 140B; located outside of Authorized Portion 140A; located outside the runtime boundaries as defined via the MPU/MMU Configuration Unit 142), then a Fault (or error, or exception) would occur, and a Fault Detector 143 may detect the fault and log it, and may notify the developer (in real time, or subsequently) that a memory access fault has occurred. In some implementations, optionally, Fault Detector 143 may be configured or constructed to track, log, or report one or more types of faults or errors, for example: a memory read error or fault; a memory write error or fault; a memory access error or fault; an error or fault in (or related to) memory mapping or memory allocation, such as a failure of a malloc function or other memory allocation operation; a "crash" or an unexpected stopping of the executed code; non-responsiveness of the code, or the code being stuck in an infinite loop; or other faults or errors.

Optionally, an Iterative Memory-Boundaries Configurator 144 may be utilized in order to automate and implement a process, in which the memory boundaries for the runtime of the Target Code 122 (e.g., the size or the relative size of Authorized Portion 140A and/or Blocked Portion 140B, or their ratio) are defined and then re-defined iteratively. Based on such runtime iterations, a Minimum Required RAM Determination Unit 147 may operate to determine the minimum size of RAM memory that is required in order for the Target Code 122 to properly run (e.g., to run without causing any memory access fault or memory access error). In a demonstrative example, the Iterative Memory-Boundaries Configurator 144 may implement a binary search algorithm (or a "binary chop" search algorithm, or a half-interval search algorithm) to find the minimum RAM memory that would be required at runtime of Target Code 122. It is noted that the binary search algorithm is only a non-limiting example, which may be implemented via a Required RAM Searcher Unit 151; which, in other implementations, may utilize other suitable types of search algorithms in order to achieve the same goal. For example, the full size of RAM memory unit 140 is 2,000 kilobytes; the Iterative Memory-Boundaries Configurator 144 divides this by two, and configures the MPU/MMU 139 to allow runtime access to only the first 1,000 kilobytes of RAM memory unit 140. Such runtime of Target Code 122 is monitored, and no memory access faults are detected by the Fault Detector 143 (e.g., within a complete run; or within a run that performs a particular set of operations; or within a run that spans a pre-defined number of operations or time). Then, the Iterative Memory-Boundaries Configurator 144 proceeds automatically to divide by half the last used boundary (which was 1,000 kilobytes), and it configures the MPU/MMU 139 to allow runtime access to only the first 500 kilobytes of RAM memory unit 140. Then, another run of Target Code 122 is executed (with enforcement of the new memory boundary of 500 kilobytes), and memory access faults are monitored but are not detected. Then, the Iterative Memory-Boundaries Configurator 144 again halves the previous boundary (which was 500 kilobytes), and configures the MPU/MMU 139 to allow access only to 250 kilobytes of RAM memory unit 140. In such run of Target Code 122, a memory access fault is detected; thereby indicating that while 500 kilobytes of RAM memory are sufficient, 250 kilobytes of RAM memory are not sufficient. In the next iteration, the Iterative Memory-Boundaries Configurator 144 halves the interval between 250 and 500 kilobytes, thereby setting a new RAM memory boundary of 375 kilobytes, and triggering an additional run of Target Code 122 with such boundary. If this run (at 375 kilobyte memory boundary) lacks any memory access fault, then the next run of Target Code 122 would be performed with a memory boundary of 313 kilobytes (e.g., approximately the average of 250 and 375 kilobytes); whereas, if that run (at 375 kilobyte memory boundary) caused a memory access fault, then the next run of Target Code 122 would be performed with a memory boundary of 438 kilobytes (e.g., approximately the average of 375 and 500 kilobytes). The iterative process may be repeated for a pre-defined number of iterations (e.g., for 10 iterations); or, until the interval of memory range that needs to be checked is smaller than a pre-defined threshold value (e.g., the system determined that the minimum required RAM memory is "between 250 and 283 kilobytes", and that interval of 33 kilobytes is smaller than a pre-defined value of, for example, 50 kilobytes).

Accordingly, system 100A and its Iterative Memory-Boundaries Configurator 144 may enable efficient, rapid, iterative testing of the minimum RAM memory size that is required by Target Code 122 in order to run properly; without the need to re-compile the Source Code 121 or to re-build the Target Code 122 or to generate multiple different images of the Target Code 122 for this purpose. Rather, a single version of the executable Target Code 122, or a single image of the executable Target Code 122, or a single compiled Target Code 122, may be used and re-used, repeatedly and iteratively, without re-building of images or re-compilation into multiple versions of executables; by causing dynamic configuration and re-configuration of the MPU/MMU 139 during runtime (or, immediately prior to each run of Target Code 122; or, immediately at the commencement of each run of Target Code 122).

Additionally or alternatively, system 100A may include a RAM Sufficiency Determination Unit 146, which may enable a developer to efficiently and rapidly test and verify, whether a particular Target Code 122 (e.g., firmware, executable code) is expected to run properly on a runtime platform that would have a particular RAM memory size. In a demonstrative implementation, a developer receives a request to develop a firmware code that would require only 320 kilobytes of RAM memory at runtime. The developer utilizes the Development Platform 105 to write an initial source code 121, and to generate (compile, build) from it an initial Target Code 122, denoted as Build 1. The developer utilizes the Testing Platform 107 and the MPU/MMU Configuration Unit 142 to configure the MPU/MMU 139 to allow runtime access of the Target Code 122 to only to 320 kilobytes of RAM memory (even though the Development Platform 105 itself or the Testing Platform 107 itself has RAM memory of (for example) 2,000 kilobytes). The run of Target Code 122 (Build 1) is thus executed via the Testing Platform 107 with an enforced constraint of access to only 320 kilobytes of RAM memory. In a demonstrative example, this run causes a memory access fault, that is detected by the Fault Detector 143 and is reported or notified to the developer. Accordingly, the developer reviews and modifies his source code 122, and generates from it a modified Target Code 122 (Build 2), which he again tests with a memory access boundary of 320 kilobytes. This version (Build 2) of the Target Code 122 did not generate any memory access faults; and the developer now knows that this Target Code 122 (Build 2) is expected to run properly on a runtime platform or a runtime device that is equipped with only 320 kilobytes of RAM memory.

In some implementations, system 100A may further be utilized for other purposes; such as, for debugging code, and for detecting code that attempts to access a memory address or a memory region that is "forbidden" for such code to access, or that was not allocated to a particular code or process or thread or program, or for discovering unexpected attempts by a code to access a memory address or a memory region that the developer did not intend such code to access. Some implementations may be utilized for other purposes that may involve tracking of memory usage, or that may involve tracking of memory address space access.

The Applicants have realized that system 100A may provide benefits or advantageous that are not available from conventional systems, and that are not available from (for example) a conventional emulator or simulator. For example, a conventional emulator program or simulator program may run on a laptop computer having a RAM memory of 8,000 kilobytes, to emulate or to simulate a different computing device that has a RAM memory of only 1,000 kilobytes. However, such conventional emulators or simulators only provide an emulated environment or a simulated environment, and by definition they cannot ensure that the emulated or simulated program does not access memory regions or memory space that is beyond the intended memory space that was prescribed for the emulation or simulation purposes. In the scenario, an emulated program may run properly on the emulator program which emulates a 1,000 kilobyte RAM memory; yet in fact, the emulated program might perform a read access from a memory address that is beyond those 1,000 kilobytes of RAM memory, without necessarily triggering a fault or a crash. Similarly, in that scenario, an emulator or a simulator program may fail to properly detect or to properly report a forbidden memory access, or may handle it in a manner that conceals it rather than reporting it. Furthermore, even an observation that a memory access fault has occurred in a simulated or emulated environment, may still be a result of other issues and may not necessarily be indicative of the RAM memory size that is required; for example, such fault may occur due to a failure of the emulator or simulator program itself, or due to incorrect programming or configuring of such emulator or simulator program, or due to failure of such emulator or simulator to provide perfect or seamless emulation or simulation, or the like. In contrast, system 100A and its implementations may be utilized to run the actual Target Code 122, directly on an actual processor and with access to a RAM memory, without the need for intermediate emulators or simulators that affect the process and that are only emulated or simulated versions.

Figure 1B:
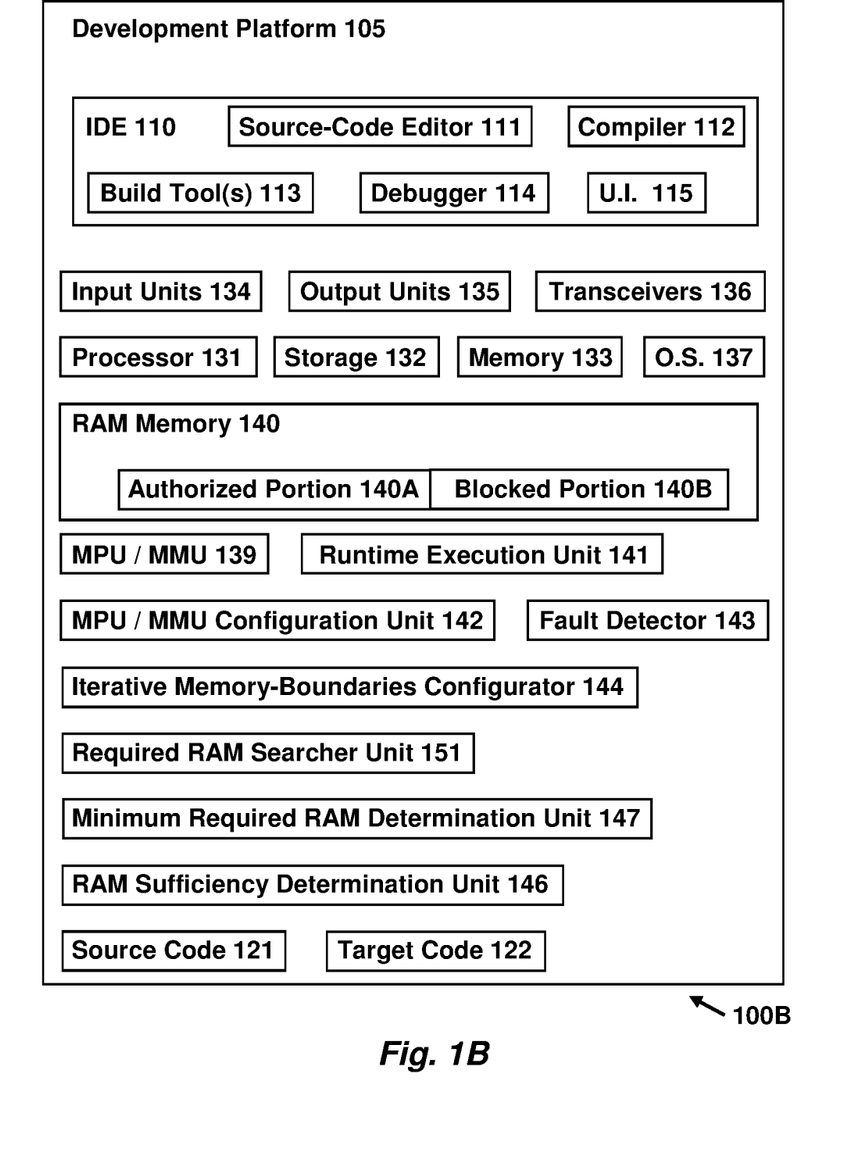
FIG. 1B is a schematic illustration of another system, in accordance with some implementations.

Reference is made to FIG. 1B, which is a block diagram illustration of a system 100B, in accordance with some demonstrative implementations. System 100B may be generally similar to system 100A of FIG. 1A; however, all the components may be implemented as a single, unified, apparatus that enables both development and testing of the Target Code 122, rather than separating the system into a Development Platform and a Testing Platform. This is only a non-limiting example; and other implementations may utilize a different number of devices or units, or may distribute the components of the system across multiple devices in other suitable ways.

Figure 2:
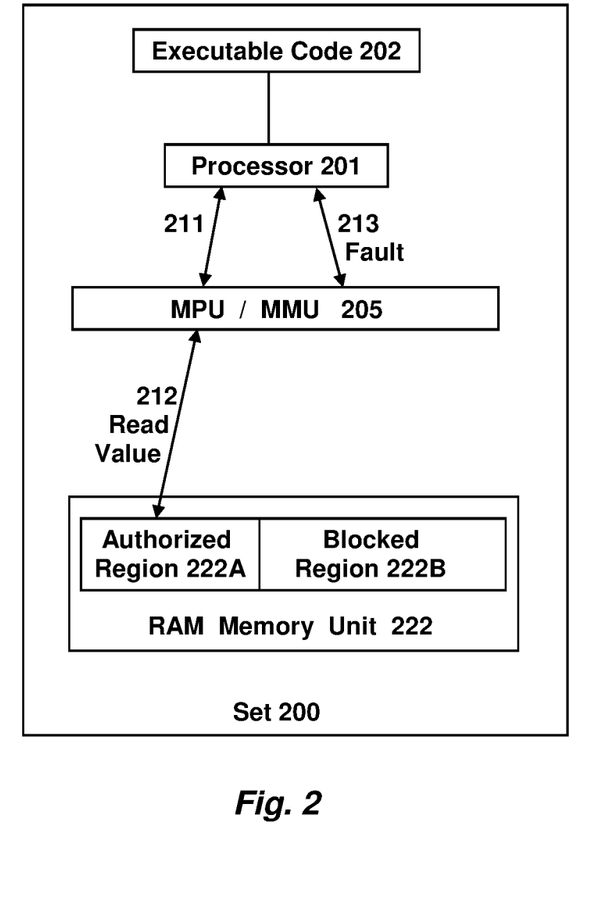
FIG. 2 is a schematic illustration of a set of components, demonstrating memory usage in accordance with some implementations.

Reference is made to FIG. 2, which is a schematic illustration of a set of components 200, demonstrating RAM memory usage in accordance with some implementations. For example, a processor 201 may execute the instructions of an executable code 202. Access of processor 201 to a RAM memory unit 222 (e.g., of 1,000 kilobytes) is performed via an MPU/MMU 205, which defines two portions or two regions in RAM memory unit 222: an Authorized Region 222A (e.g., having the first 300 kilobytes), and a Blocked Region 222B (e.g., having the remaining 700 kilobytes).

As the processor 201 executes the executable code 202, an instruction in executable code 202 attempts to cause the processor to read data from a memory address located in the 200th kilobyte of RAM memory, which is within the Authorized Region 222A. Accordingly, the MPU/MMU 205 authorizes and allows such read operation, and the read value is returned to the processor 201. This sequence of operations is indicated by the two double-sided arrows 211 and 212, indicating the authorized access.

In contrast, another instructions in executable code 202 later attempts to read data from a memory address located in the 400th kilobyte of RAM memory, which is beyond or is external to the Authorized Region 222A, and is within the Blocked Region 222B. Accordingly the MPU/MMU 205 blocks and prevents such read operation, and returns a Fault or an Error or an Exception signal or message or flag to processor 201. This sequence of operations is indicated by the single double-sided arrow 213, and by a lack of an additional arrow or line between the MPU/MMU 205 and the Blocked Region 222B since the access to that memory region is blocked by the MPU/MMU 205 and is not performed.

In accordance with some implementations, a system comprises: a Memory Protection Unit (MPU) associated with a Random Access Memory (RAM) memory unit; and an MPU configuration unit, to indicate to said MPU a limited size of RAM that would be available to a particular executable code during its runtime. The MPU is (i) to allow access of said particular executable code, during its runtime, to said limited size of RAM in said RAM memory unit, and (ii) to block any access of said particular executable code, during its runtime, to a forbidden memory region which includes any other region of said RAM memory unit that is beyond said limited size of RAM.

In some implementations, the system further comprises: a fault detector to detect that a run of said particular executable code causes a memory access fault due to access to said forbidden memory region; and to generate a notification that said limited size of RAM is insufficient for proper execution of said particular executable code.

In some implementations, the system further comprises: a fault detector to check whether or not a run of said particular executable code causes a memory access fault due to access of said particular executable code to said forbidden memory region; a RAM sufficiency determination unit, to determine that a particular size of RAM memory is sufficient for proper execution of said particular executable code, based on lack of detection of memory access faults.

In some implementations, said limited size of RAM memory, that would be accessible by said executable code, (i) is not defined in a source code of said particular executable code, and (ii) is not defined by said particular executable code.

In some implementations, said limited size of RAM memory, that would be accessible by said executable code, (i) is not defined in said source code, and (ii) is not defined by said particular executable code, and (iii) is set by the MPU configuration unit prior to runtime of said particular executable code, and (iv) is enforced by the MPU during runtime of said particular executable code.

In some implementations, an apparatus comprises: a Memory Protection Unit (MPU) associated with a Random Access Memory (RAM) memory unit; wherein the MPU is to enable access of an executable code during its runtime, only to an allowed portion of said RAM memory unit; wherein the MPU is to prevent access of said executable code during its runtime, to a forbidden portion of said RAM memory unit, said forbidden portion comprising all memory space that is not in said allowed portion; an Iterative Memory-Boundaries Configurator unit, to iteratively modify a configuration of said MPU, by modifying in each iteration the size of the allowed portion of RAM that would be available to said executable code during runtime.

In some implementations, the apparatus comprises: a fault detector to check, in each iteration, whether or not a run of said executable code caused a memory access fault due to access of said executable code to said forbidden portion of said RAM memory unit.

In some implementations, the apparatus comprises or is operatively associated with: a Minimum Required RAM Determination Unit, to determine a minimum size of RAM that is required for proper operation of said executable code, based on output received from said fault detector indicating (i) which one or more iterations caused a memory access fault, and indicating (ii) which one or more iterations did not cause a memory access fault.

In some implementations, the apparatus comprises or is operatively associated with: a required RAM searcher unit, to implement a search algorithm that searches for the minimum size of RAM that is required for proper operation of said executable code, based on a plurality of iterations of running said executable code with a different limit of available RAM that is enforced by said MPU. In some implementations, the required RAM searcher unit implements a binary search algorithm to determine the minimum size of RAM that is required for proper operation of said executable code.

In some implementations, in each iteration, the same image of said executable code is executed on the same processor and on the same RAM memory unit, wherein the size of RAM memory that is accessible by said executable code at runtime is modified at the beginning of each iteration. In some implementations, in each iteration, the same executable code is executed without being re-compiled and without a need to edit or modify any source code of said executable code.

In some implementations, a method comprises: (a) dynamically modifying, in an iterative process comprising two or more iterations, a maximum size of Random Access Memory (RAM) that a Memory Protection Unit (MPU) authorizes an executable program code to access; (b) in each of said iterations, running said executable program code while said MPU enforces a different maximum size of RAM that the executable program code is authorized to access, and monitoring whether said executable program code attempted to access a RAM memory address that is beyond said maximum size of RAM in said iteration; (c) based on said iterations, determining a minimum size of RAM that is required for said executable program code to run without causing a memory access fault.

In some implementations, the apparatus comprises: said executable program code is an executable firmware code; wherein step (b) comprises running said executable firmware code while said MPU enforces said maximum size of RAM; wherein step (c) comprises determining the minimum size of RAM that is required for said executable firmware code to run without causing a memory access fault.

In some implementations, the maximum size of RAM, that the MPU enforces in each iteration of running said executable program code, is determined based on a pre-defined search algorithm.

In some implementations, the maximum size of RAM, that the MPU enforces in each iteration of running said executable program code, is determined based on a pre-defined Binary Search algorithm.

In some implementations, each of said iterations comprises running an image of said executable program code that is identical across all of said iterations.

In some implementations, each of said iterations comprises running a same single executable program code, without modifying in each iteration any memory limit that is set in a source code of said program code.

In some implementations, each of said iterations comprises running a same single executable program code, without modifying in each iteration any memory limit that is set in a source code of said program code, and without re-compiling said source code for each of said iterations, and without creating a new image of said executable program code for each of said iterations.

In some implementations, the method is performed automatically based on a user command to an Integrated Development Environment (IDE) to determine the minimum RAM requirements for said executable program code, and without requiring said user to modify a source code of said executable program code.

Some implementations include devices, systems, and methods of determining memory requirements and tracking memory usage. For example, a method includes: dynamically modifying, in an iterative process including two or more iterations, a maximum size of Random Access Memory (RAM) that a Memory Protection Unit (MPU) authorizes an executable program code to access. In each iteration, the method includes running that executable program code while the MPU enforces a different maximum size of RAM, and monitoring whether the executable program code attempted to access a RAM memory address that is beyond that maximum size of RAM in that iteration. Based on such iterations, the method determines a minimum size of RAM that is required for that executable program code to run without causing a memory access fault.

In some implementations, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some implementations are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some implementations may utilize a special-purpose machine or a specific-purpose device that is not a generic computer, or may use a non-generic computer or a non-general computer or machine. Such system or device may utilize or may comprise one or more components or units or modules that are not part of a "generic computer" and that are not part of a "general purpose computer", for example, cellular transceiver, cellular transmitter, cellular receiver, GPS unit, location-determining unit, accelerometer(s), gyroscope(s), device-orientation detectors or sensors, device-positioning detectors or sensors, or the like.

Some implementations may utilize an automated method or automated process, or a machine-implemented method or process, or as a semi-automated or partially-automated method or process, or as a set of steps or operations which may be executed or performed by a computer or machine or system or other device.

Some implementations may utilize code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), Register-Transfer Level (RTL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or terms such as "implementation" or "implementations", may indicate that the embodiment(s) or implementation(s) so described may optionally include a particular feature, structure, functionality, or characteristic, but not every embodiment or implementation necessarily includes the particular feature, structure, functionality or characteristic. Furthermore, repeated use of the phrase "in one embodiment" or "in one implementation", does not necessarily refer to the same embodiment, although it may. Similarly, repeated use of the phrase "in some embodiments" or "in some implementations", does not necessarily refer to the same set or group of embodiments or implementations, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some implementations may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a set-top box, a cables television box or receiver or decoder, a satellite-based television box or receiver or decoder, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some implementations may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some implementations may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more implementations, may be combined with, or may be utilized in combination with, one or more other functions, operations, components and/or features described herein with reference to one or more other implementations. Some implementations may comprise any possible or suitable combinations, re-arrangements, assembly, re-assembly, or other utilization of some or all of the modules or functions or components or units that are described herein, even if they are discussed in different locations or different chapters of the above discussion, or even if they are shown across different drawings or multiple drawings.

While certain features of some demonstrative implementations have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:

a Memory Protection Unit (MPU) associated with a Random Access Memory (RAM) memory unit; an MPU configuration unit, to indicate to said MPU a limited size of a part of the RAM memory unit that would be available to a particular executable code during its runtime; wherein the MPU is (i) to allow access of said particular executable code, during its runtime, to said limited size of RAM in said part of the RAM memory unit, and (11) to block any access of said particular executable code, during its runtime, to a forbidden memory region of the RAM memory unit which includes any other region of said RAM memory unit that is beyond said part of the RAM memory unit having the limited size; and an Iterative Memory-Boundaries Configurator unit, to iteratively modify a configuration of said MPU, by modifying in each iteration the size of the allowed portion of RAM that would be available to said executable code during runtime such that the blocked part of the RAM memory unit of the forbidden portion changes in size for each iteration.

2. The system of claim 1, further comprising:

a fault detector to detect that a run of said particular executable code causes a memory access fault due to access to said forbidden memory region; and to generate a notification that said limited size of RAM is insufficient for proper execution of said particular executable code.

3. The system of claim 1, further comprising:

a fault detector to check whether or not a run of said particular executable code causes a memory access fault due to access of said particular executable code to said forbidden memory region; and a RAM sufficiency determination unit, to determine that a particular size of RAM memory is sufficient for proper execution of said particular executable code, based on lack of detection of memory access faults.

4. The system of claim 1, wherein said limited size of RAM memory, that would be accessible by said executable code, (i) is not defined in a source code of said particular executable code, and (ii) is not defined by said particular executable code.

5. The system of claim 1, wherein said limited size of RAM that would be accessible by said particular executable code, (i) is not defined in a source code of said particular executable code, and (ii) is not defined by said particular executable code, and (iii) is set by the MPU configuration unit prior to runtime of said particular executable code, and (iv) is enforced by the MPU during runtime of said particular executable code.

6. An apparatus comprising:

a Memory Protection Unit (MPU) associated with a Random Access Memory (RAM) memory unit;

wherein the MPU is to enable access of an executable code during its runtime, only to an allowed portion of said RAM memory unit, the allowed portion being a part of the RAM memory unit;

wherein the MPU is to prevent access of said executable code during its runtime, to a forbidden portion of said RAM memory unit, said forbidden portion comprising all memory space that is not in said allowed portion, the forbidden portion being a blocked part of the RAM memory unit; and an Iterative Memory-Boundaries Configurator unit, to iteratively modify a configuration of said MPU, by modifying in each iteration the size of the allowed portion of RAM that would be available to said executable code during runtime such that the blocked part of the RAM memory unit of the forbidden portion changes in size for each iteration.

7. The apparatus of claim 6, comprising:

a fault detector to check, in each iteration, whether or not a run of said executable code caused a memory access fault due to access of said executable code to said forbidden portion of said RAM memory unit.

8. The apparatus of claim 7, wherein the apparatus comprises or is operatively associated with:

a Minimum Required RAM Determination Unit, to determine a minimum size of RAM that is required for proper operation of said executable code, based on output received from said fault detector indicating (i) which one or more iterations caused a memory access fault, and indicating (ii) which one or more iterations did not cause a memory access fault.

9. The apparatus of claim 6, wherein the apparatus comprises or is operatively associated with:

a required RAM searcher unit, to implement a search algorithm that searches for the minimum size of RAM that is required for proper operation of said executable code, based on a plurality of iterations of running said executable code with a different limit of available RAM that is enforced by said MPU.

10. The apparatus of claim 9, wherein the required RAM searcher unit implements a binary search algorithm to determine the minimum size of RAM that is required for proper operation of said executable code.

11. The apparatus of claim 9, wherein in each iteration of running said executable code, a same image of said executable code is executed on a same processor and on the same RAM memory unit, wherein the size of RAM memory that is accessible by said executable code at runtime is modified at the beginning of each iteration.

12. The apparatus of claim 9, wherein in each iteration, the same executable code is executed without being re-compiled and without a need to edit or modify any source code of said executable code.

13. A method comprising:

(a) dynamically modifying, in an iterative process comprising two or more iterations of running an executable program code, a maximum size of Random Access Memory (RAM) that a Memory Protection Unit (MPU) authorizes the executable program code to access;

(b) in each of said iterations of running the executable program code, running said executable program code while said MPU enforces a different maximum size of RAM that the executable program code is authorized to access, and monitoring whether said executable program code attempted to access a RAM memory address that is beyond said maximum size of RAM in said iteration; and (c) based on said iterations of running the executable program code, determining a minimum size of RAM that is required for said executable program code to run without causing a memory access fault.

14. The method of claim 13,
wherein said executable program code is an executable firmware code;
wherein step (b) comprises running said executable firmware code while said MPU enforces said maximum size of RAM;
wherein step (c) comprises determining the minimum size of RAM that is required for said executable firmware code to run without causing a memory access fault.

15. The method of claim 13,
wherein the maximum size of RAM, that the MPU enforces in each iteration of running said executable program code, is determined based on a pre-defined search algorithm.

16. The method of claim 13,
wherein the maximum size of RAM, that the MPU enforces in each iteration of running said executable program code, is determined based on a pre-defined Binary Search algorithm.

17. The method of claim 13,
wherein each of said iterations comprises running an image of said executable program code that is identical across all of said iterations.

18. The method of claim 13,
wherein each of said iterations comprises running a same single executable program code, without modifying in each iteration any memory limit that is set in a source code of said program code.

19. The method of claim 13,
wherein each of said iterations comprises running a same single executable program code, without modifying in each iteration any memory limit that is set in a source code of said program code, and without re-compiling said source code for each of said iterations, and without creating a new image of said executable program code for each of said iterations.

20. The method of claim 13,
wherein the method is performed automatically based on a user command to an Integrated Development Environment (IDE) to determine the minimum RAM requirements for said executable program code, and without requiring said user to modify a source code of said executable program code.

\* \* \* \* \*